United States Patent [19]

Yoshida

[11] Patent Number: 5,973,793
[45] Date of Patent: Oct. 26, 1999

[54] IMAGE RECORDING APPARATUS WITH MEANS FOR CUTTING A STANDARD PAPER SIZE BASED ON AN IMAGE SIZE

[75] Inventor: Takehiro Yoshida, Tokyo, Japan

[73] Assignee: Canon Kabushiki Kaisha, Tokyo, Japan

[21] Appl. No.: 08/575,584

[22] Filed: Dec. 20, 1995

Related U.S. Application Data

[60] Continuation of application No. 08/395,099, Feb. 27, 1995, abandoned, which is a division of application No. 08/296,975, Aug. 26, 1994, which is a continuation of application No. 07/770,894, Oct. 4, 1991, abandoned.

[30] Foreign Application Priority Data

Oct. 15, 1990  [JP]  Japan ................................ 2-277406

[51] Int. Cl.⁶ .................................................. H04N 1/00
[52] U.S. Cl. ........................................ 358/449; 358/304
[58] Field of Search .................................. 358/449, 434, 358/435, 436, 438, 468, 451, 304; 250/560; 355/309, 310, 311; 346/136

[56] References Cited

U.S. PATENT DOCUMENTS

| | | |
|---|---|---|
| 4,169,275 | 9/1979 | Gunning . |
| 4,310,859 | 1/1982 | Takahashi et al. . |
| 4,439,790 | 3/1984 | Yoshida .................... 358/449 |
| 4,554,592 | 11/1985 | Yoshida .................... 358/449 |
| 4,580,171 | 4/1986 | Arimoto .................... 358/451 |
| 4,647,188 | 3/1987 | Komiya et al. . |
| 4,814,893 | 3/1989 | Katoh ....................... 358/449 |
| 4,969,016 | 11/1990 | Kudoh . |
| 5,057,937 | 10/1991 | Muramatsu . |
| 5,068,743 | 11/1991 | Araki . |
| 5,144,452 | 9/1992 | Abuyama ................. 358/296 |
| 5,172,178 | 12/1992 | Oushiden et al. ........ 355/311 |
| 5,404,022 | 4/1995 | Stapleton ................. 250/560 |

FOREIGN PATENT DOCUMENTS

| | | |
|---|---|---|
| 054438 | 7/1982 | European Pat. Off. . |
| 094046 | 11/1983 | European Pat. Off. . |
| 391632 | 10/1990 | European Pat. Off. . |
| 54-116862 | 7/1983 | Japan . |
| 1-180376 | 7/1989 | Japan ............... B41J 13/00 |

Primary Examiner—Scott A. Rogers
Attorney, Agent, or Firm—Fitzpatrick, Cella, Harper & Scinto

[57] ABSTRACT

An image recording apparatus for recording an image on a rolled paper, and for cutting the rolled paper on which the image has been recorded to a standard size. The image recording apparatus includes a detection device for detecting a length of an image to be recorded on the rolled paper; a storage device for storing a plurality of predetermined lengths corresponding to a plurality of standard sizes; a selection device for selecting a selected length from the plurality of predetermined lengths, the selected length (i) being longer than the detected image length, and (ii) being nearest to the detected image length from among the plurality of predetermined lengths; and a cutting device for cutting the rolled paper, on which the image has been recorded, to the length selected by the selection device.

48 Claims, 9 Drawing Sheets

FIG. 2F (ROUTINE WHLMAXST)
DETERMINE MAXIMUM NUMBER OF WHITE LINES ADDED TO TRAILING END

WHITE LINE MAX SET (WHLMAXST)

INPUT MAXIMUM LENGTH OF ADDITIONAL WHITE LINES TO BE ADDED TO TRAILING END FROM SERVICE SOFT SWITCH (mm) — S56-1

DETERMINE MAXIMUM NUMBER OF WHITE LINES ADDED TO TRAILING END IN ACCORDANCE WITH MODE (STANDARD, FINE, SUPER FINE) AND STORE IT IN WHLINECTMAX — S56-2

(RETURN)

FIG. 2H

| T. CONSTCUTA4 [0] | (A5 HORIZONTAL) 571.725 |
|---|---|
| T. CONSTCUTA4 [2] | (LETTER) 1075.69 |
| T. CONSTCUTA4 [4] | (A-4) 1143.45 |
| T. CONSTCUTA4 [6] | (LEGAL) 1369.06 |
| T. CONSTCUTA4−E | |

FIG. 2I

| T. CONSTCUTB4 [0] | (B5 HORIZONTAL) 700.7 |
|---|---|
| T. CONSTCUTB4 [2] | (B-4) 1401.4 |
| T. CONSTCUTB4−E | |

| A4 RECORD | LINE NUMBER IN STANDARD MODE | LINE NUMBER IN FINE MODE | LINE NUMBER IN SUPER FINE MODE |
|---|---|---|---|
| · A4 ORIGINAL 297mm | 1143.45 | 2286.9 | 4573.8 |
| · A5 ORIGINAL HORIZONTAL 148.5mm | 571.725 | 1143.45 | 2286.9 |
| · LETTER PAPER SIZE ORIGINAL 279.4mm | 1075.69 | 2151.38 | 4302.76 |
| · LEGAL SIZE ORIGINAL 355.6mm | 1369.06 | 2738.12 | 5476.14 |

| B4 RECORD | LINE NUMBER IN STANDARD MODE | LINE NUMBER IN FINE MODE | LINE NUMBER IN SUPER FINE MODE |
|---|---|---|---|
| · B4 ORIGINAL 364mm | 1401.4 | 2802.8 | 5605.6 |
| · B5 ORIGINAL 182mm | 700.7 | 1401.4 | 2802.8 |

FIG. 4

IMAGE RECORDING APPARATUS WITH MEANS FOR CUTTING A STANDARD PAPER SIZE BASED ON AN IMAGE SIZE

This application is a continuation of application Ser. No. 08/395,099 filed Feb. 27, 1995, now abandoned, which is a division of application Ser. No. 08/296,975, filed Aug. 26, 1994, now pending, which is a continuation of application Ser. No. 07/770,894, filed Oct. 4, 1991, now abandoned.

BACKGROUND OF THE INVENTION

1. Field of the Invention

The present invention relates to an image recording apparatus, and particularly to an image recording apparatus for recording an image on long recording paper, such as roll paper or the like, and for cutting the recording paper.

2. Description of the Related Art

A known example of such an apparatus is a facsimile apparatus which records a received image on roll paper, cuts the roll paper on which the image is recorded and outputs the image. In general facsimile apparatuses, the roll paper is cut according to the size of the received image on one page. Since information about a sending side, such as the telephone number, abbreviation thereof and the like, are generally added to the received image, the received image size (the length of the received image) for an A4 size original is increased to a length obtained by adding the length of the sending-side information to the A4 size length. When the received images are filed, each has an inconvenient non-standard length.

A facsimile apparatus has been thus proposed in which a received image of a standard size is recorded and cut off from roll paper to obtain a received image of a standard size for filing or the like. In this facsimile apparatus which cuts the roll paper to a standard size, a received image is recorded after being stored in a received image memory so that when the received image exceeds a standard size by α (for example, 1 cm) or less, the received image is corrected to an image of a standard size and then cut off from the roll paper. This permits the formation of a recorded image of a standard size.

In the above facsimile apparatus which cuts the roll paper to a standard size, it is difficult to appropriately cut the roll paper if no image memory is provided.

Namely, a facsimile apparatus which records a received image in real time without using an image memory has the problem that, for example, when an image of a size (a standard size+α) is recorded, the length α cannot be cut out and a recorded image of a standard size cannot be obtained.

SUMMARY OF THE INVENTION

Considering the above problem, it is an object of the present invention to provide an improved image recording apparatus.

It is another object of the present invention to provide an image recording apparatus capable of cutting paper to a standard size without the need for a large capacity image memory.

It is a further object of the present invention to provide an image recording apparatus which records an image on roll paper and which removes a leading end portion of the recorded image when the paper is cut to a standard size and adds blank space to the recorded image to obtain a standard size when the size of the recorded image is less than a predetermined standard size.

In one aspect of the invention, there is provided an image recording apparatus for recording an image having an image length on rolled paper and cutting the paper to a standard size. The apparatus includes means for inhibiting printing of a leading end portion of an image to be recorded, size discrimination means for determining whether the recorded image has a predetermined standard size length and space addition means for adding blank spaces to the image when the image length is less than the standard size length.

In a second aspect of the invention, there is provided an image recording apparatus for recording an image having an image length on rolled paper and cutting the rolled paper to a standard size to output a recorded image on a standard size sheet. A first setting means sets the length of the leading end portion of the recorded image whose printing is to be inhibited. A control means is provided for inhibiting printing of the leading end portions of the image according to the setting by the setting means and for comparing the image length to a predetermined standard size length and adding blank space to the image according to the results of the comparison, thereby outputting the image in a standard size.

In still another aspect of the invention, there is provided a method for obtaining a recorded image in the standard size. Printing of leading end portions of an image which has a predetermined length is inhibited, the image is recorded and then a comparison is made of the length of the recorded image to a predetermined standard size length whereupon space is added to the recorded image in accordance with the results of the comparison.

Other objects of the present invention will be made clear from the detailed description of embodiments below and from the drawings.

DETAILED DESCRIPTION OF THE PREFERRED EMBODIMENTS

An embodiment of the present invention is described below with reference to the drawings.

In standard size paper cutting in a facsimile apparatus of this embodiment, roll paper is cut to a standard paper size so that recorded images have a constant length in the vertical scanning direction. This standard size paper cutting enables recording of an image of a standard size and is convenient for filing or the like even when roll paper is used.

Registration is described below. A standard size paper cutting mode (YES/NO) is selected by a user soft switch (a mode setting switch set by software processing). For example, although the user soft switch is initialized to disable the standard size paper cutting mode (NO), when standard size paper cutting is desired, the standard size paper cutting mode (YES) is selected by the user soft switch. The leading end removal length in mm is then selected by a service soft switch (a mode setting switch which is set by software processing, like the user soft switch, and which can be set by the operation of a service man). For example, although the leading end information removal length is initialized to 10 mm, a length of 5 mm, 6 mm, 12 mm or the like can be selected. The maximum length of trailing end additional blank space in mm, is also selected by the service soft switch. For example, although the maximum length is initialized to 10 mm, any desired length can be selected, like the leading end removal length.

When standard size paper cutting mode (YES) is not selected by the user soft switch, the recording paper is cut when a page end signal is received, regardless of the length in the vertical scanning direction. A description will now be given of a case where standard size paper cutting mode (YES) is selected by the user soft switch.

The operation of standard size paper cutting is described below.

Although an image signal for a line is received by the recording unit, blank lines corresponding to the leading end removal length selected by the service soft switch are first inserted. After the initial blank lines corresponding to the leading end information removal length have been removed, the received image is recorded. When recording on one sheet is completed, if the conditions given below are satisfied, blank lines are generated to create a standard paper size. The number of the lines recorded is then determined.

In A-4 width recording,
1) 148 mm (A5) . . . If maximum length of trailing end additional blank space≦recording length+margin≦148 mm (A5), standard A5 size paper is obtained.
2) 279 mm (letter) . . . If maximum length of trailing end additional blank space≦recording length+margin≦279 mm (letter), standard letter size paper is obtained.
3) 297 mm (A4) . . . If maximum length of trailing end additional blank space≦recording length+margin≦297 mm (letter), standard A4 size paper is obtained.
4) 356 mm (legal) . . . If maximum length of trailing end additional blank space≦recording length+margin≦356 mm (legal), standard legal size paper is obtained.

In B-4 width recording,
1) 182 mm (B5) . . . If maximum length of trailing end additional blank space≦recording length+margin≦182 mm (B5), standard B5 size paper is obtained.
2) 363 mm (B4) . . . If maximum length of trailing end additional blank space≦recording length+margin≦364 mm (B4), standard B4 size paper is obtained.

Figure 4:
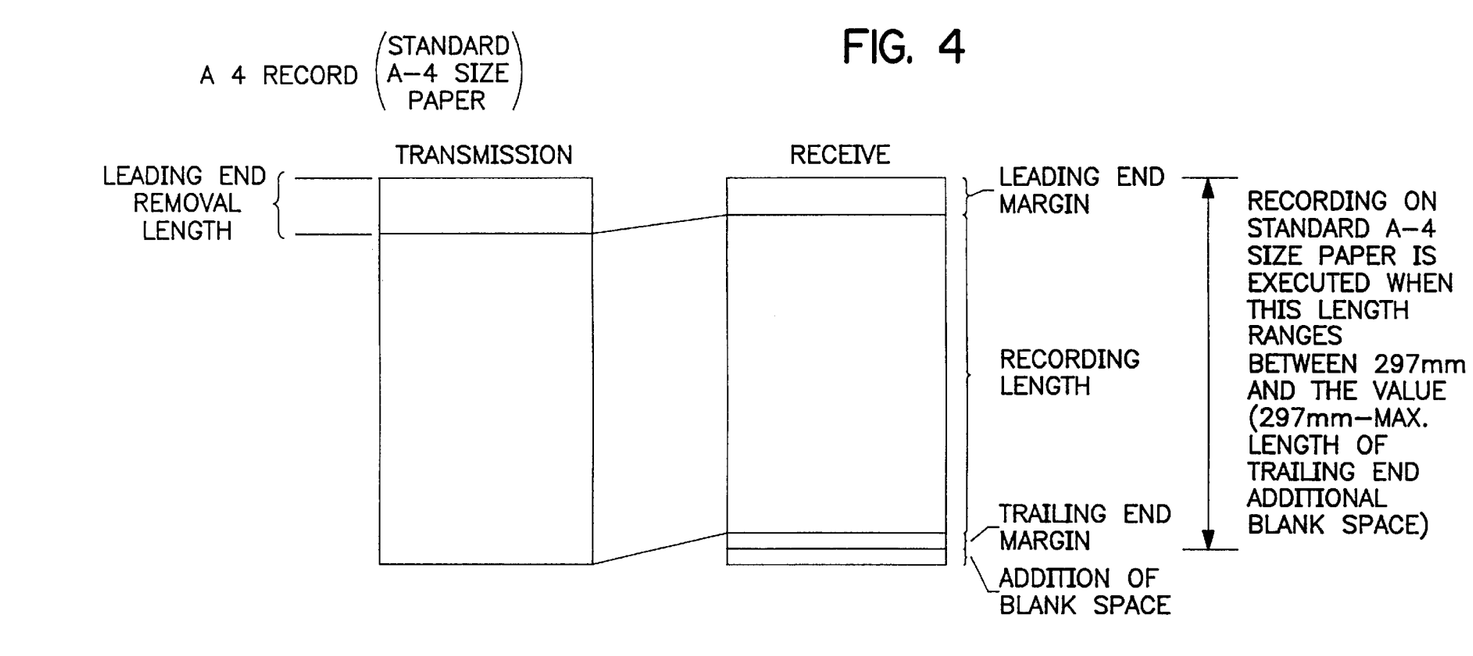
FIG. 4 is a drawing showing an example of standard A-4 size paper cutting for an A-4 recording.

FIG. 4 shows an example where roll paper is cut to standard A4 size paper during A4 recording.

Figure 1:
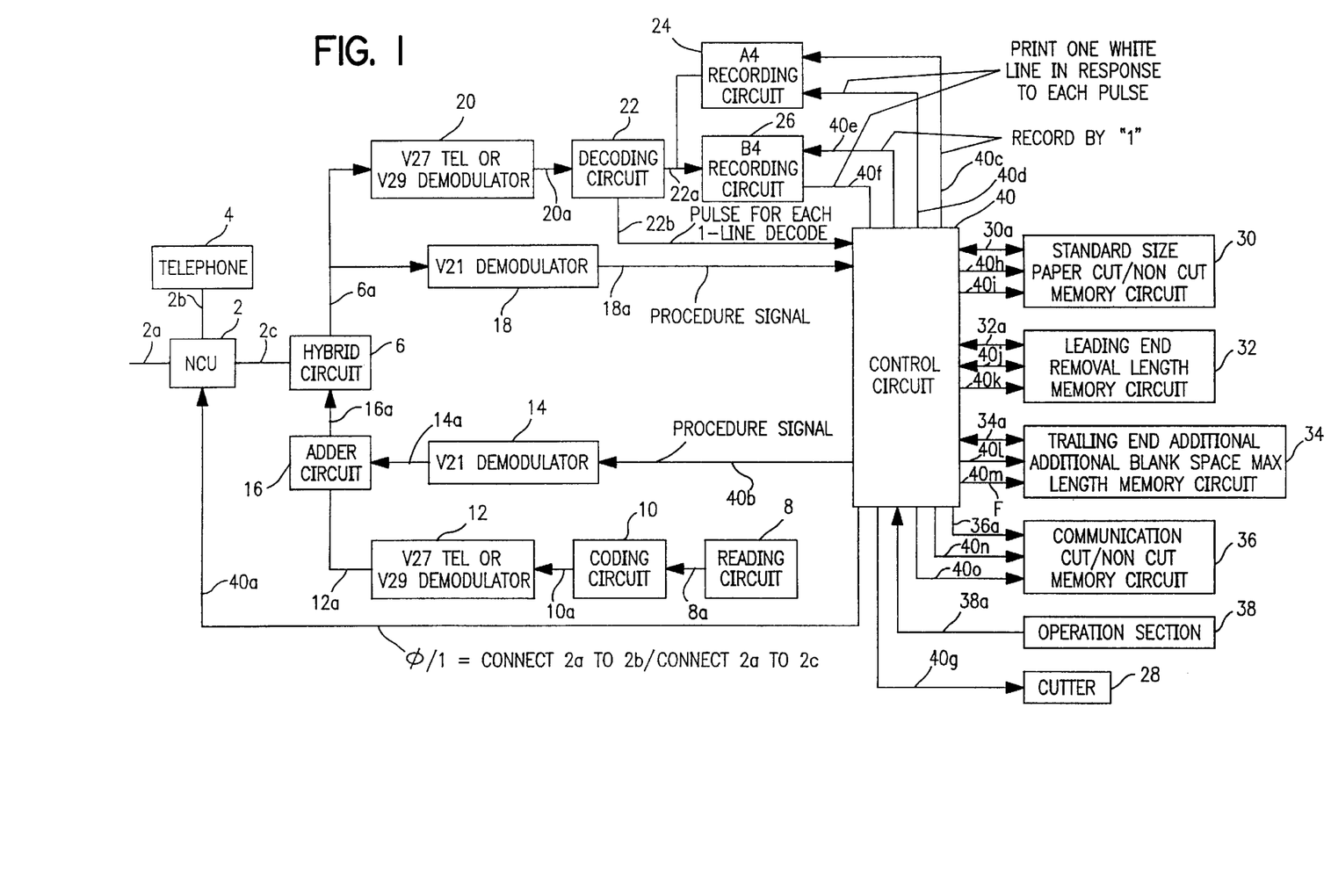
FIG. 1 is a block diagram showing the arrangement of a facsimile apparatus in accordance with an embodiment of the present invention.

FIG. 1 is a block diagram showing the basic arrangement of a facsimile apparatus in this embodiment.

In FIG. 1, reference numeral 2 denotes a network control unit (NCU) which is connected to the terminal of the telephone line of a telephone network for data communication or the like so as to control the connection in a telephone exchange network, switch to a data communication path and maintain a loop. A signal line 2a is a telephone line. A signal is input to the NCU 2 from a signal line 40a. If the signal level is "φ", the signal line 2a is connected to the telephone side, i.e., a signal line 2b. If the signal level is "1", the signal line 2a is connected to the facsimile apparatus side, i.e., a signal line 2c. In a normal state, the telephone line is connected to the telephone side.

Reference numeral 4 denotes a telephone.

Reference numeral 6 denotes a hybrid circuit for separating a signal in the transmission system from a signal in the receive system. Namely, the transmit signal of a signal line 16a is passed through to the signal line 2c and transmitted to the telephone line 2a through the NCU 2. The signal sent from the remote side is passed through the NCU 2 and then passed through the signal line 2c and output to a signal line 6a.

Reference numeral 8 denotes a reading circuit for successively reading image signals for each line, one line at a time, in the horizontal scanning direction from an original to form a signal string having a white and black binary signal. The reading circuit 8 comprises an image pick-up element such as CCD (charge coupled device) or the like. The white/black binary signal string is output to a signal line 8a.

Reference numeral 10 denotes a coding circuit into which the data output to the signal line 8a is input, and which outputs a coded signal (MH (Modified Huffman) coding or MR (Modified READ) coding) to a signal line 10a.

Reference numeral 12 denotes a modulator for modulating a signal on the basis of known CCITT recommendation V27 TEL (differential phase modulation) or V29 (quadrature modulation). The signal of the signal line 10a is input to the modulator 12 and modulated therein. Modulated data is then output to a signal line 12a.

Reference numeral 14 denotes a modulator for modulating a signal on the basis of known CCITT recommendation V21. The procedure signal of a signal line 40b is input to the modulator 14 and modulated therein. Modulated data is then output to a signal line 14a.

Reference numeral 16 denotes an adder circuit to which the signals of the signal lines 12a and 14a are input and which outputs the addition result to a signal line 16a.

Reference numeral 18 denotes a demodulator for demodulating a signal on the basis of the CCITT recommendation V21. The signal of the signal line 6a is input to the demodulator 18 and demodulated on the basis of the CCITT recommendation V21 in the demodulator 18 which outputs demodulated data to a signal line 18a.

Reference numeral 20 denotes a demodulator for demodulating a signal on the basis of the CCITT recommendation V27 TEL (differential phase modulation) or V29 (quadrature modulation). The signal of the signal line 6a is input to the demodulator 20, demodulated therein and output as demodulation data to a signal line 20a.

Reference numeral 22 denotes a decoding circuit to which the data output to the signal line 20a is input and which outputs the data decoded (MH (Modified Huffman) decoding or MR (Modified READ) decoding) to a signal 22a. After the recorded data for one line has been output to the signal line 22a, the decoding circuit 22 outputs a pulse indicating the end of decoding for one line.

Reference numeral 24 denotes a recording circuit for recording on A4 size recording paper in the horizontal scanning direction. When a signal of a signal level "1" is output to a signal line 40c, data output to the signal line 22a is input to the recording circuit 24 for successively recording data for each one line. When a signal of a signal level "φ" is output to the signal line 40c, the recording circuit 24 does not record data. The recording circuit 24 records one white line in the above mode each time a pulse is generated in a signal line 40d.

Reference numeral 26 denotes a recording circuit for recording on B4 size recording paper in the horizontal scanning direction. When a signal of a signal level "1" is output to a signal line 40e, the data output to the signal line 22a is input to the recording circuit 26 which successively records data for each one line. When a signal of a signal level "φ" is output to the signal line 40e, the recording circuit 26 does not record data. The recording circuit 26 records one white line in the above mode each time a pulse is generated in the signal line 40*f*.

Reference numeral 28 denotes a cutter for cutting when a pulse is generated in a signal line 40*g*.

Reference numeral 30 denotes a standard size paper cut/non-cut memory circuit for storing standard size paper cut/non-cut. When data is stored in the memory circuit 30, a signal of a signal level "φ" (standard paper non-cut) or "1" (standard paper cut) is output to a signal line 30*a*, and a write pulse is then generated in a signal line 40*h*. When the data stored in the standard size paper cut/non-cut memory circuit is read, a read pulse is generated in a signal line 40*i*, and the data of the signal line 30*a* is then input thereto.

Reference numeral 32 denotes a memory circuit for storing a leading end removal length. When data is stored in the memory circuit 32, the leading end removal length in mm is output to the signal line 32*a*, and a write pulse is then generated in a signal line 40*j*. When the data stored in the memory circuit 32 is read, a read pulse is generated in a signal line 40*k*, and the data of the signal line 32*a* is input thereto.

Reference numeral 34 denotes a memory circuit for storing the maximum length in mm of trailing end additional blank space. When data is stored in the memory circuit 34, the maximum length in mm of the trailing end additional blank space is output to the signal line 34*a*, and a write pulse is then generated in a signal line 40*l*. When the data stored in the memory circuit 34 is read, a read pulse is generated in a signal line 40*m*, and the data of the signal line 34*a* is input thereto.

Reference numeral 36 denotes a memory circuit for storing one communication either cut or non-cut. When data is stored in the memory circuit 36, either a signal of a signal level "φ" (one communication non-cut) or "1" (one communication cut) is output to a signal line 36*a*, and a write pulse is then generated in a signal line 40*n*. The data stored in the memory circuit 36 is read, a read pulse is generated in a signal line 40*o*, and the data of the signal line 36*a* is input thereto.

Reference numeral 38 denotes an operation section. The data input by a key such as a ten key, a function key, a one-touch key, a compaction dial key, a registration key or the like is output to a signal line 38*a*.

Reference numeral 40 denotes a control circuit for controlling the whole facsimile apparatus, the main control being described above in the first paragraph of this embodiment. The control circuit 40 comprises a microcomputer, a ROM in which a control program is stored, and a RAM or the like for temporarily storing data.

FIG. 2 is a flow chart showing the control operation of the control circuit 40, the control program for executing the flow being stored in the ROM. The operation of this embodiment is described in detail below with reference to FIG. 2.

Figure 2A:
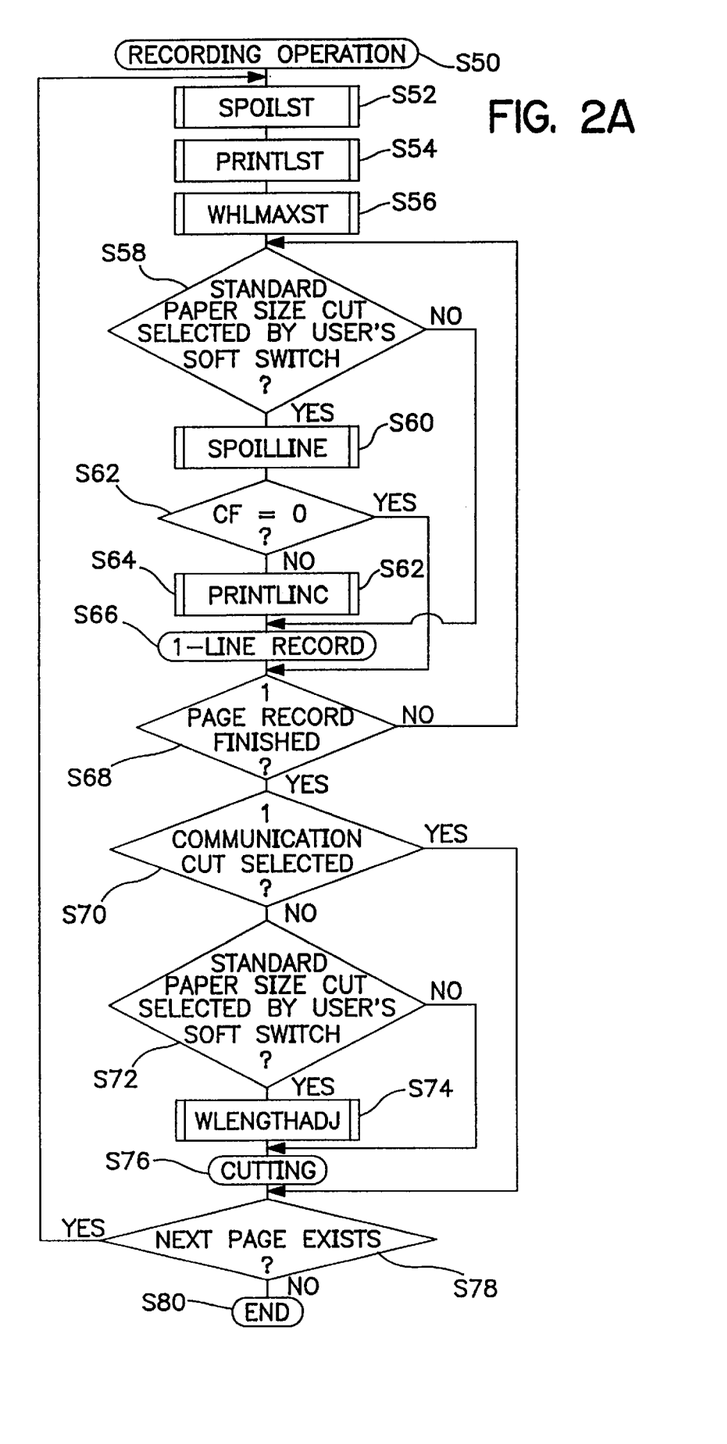
FIGS. 2(A) to 2(G) are flow charts showing the controlling operation in the same embodiment as in FIG. 1.

In FIG. 2(A), a recording operation is started in Step S50.

Figure 2B:
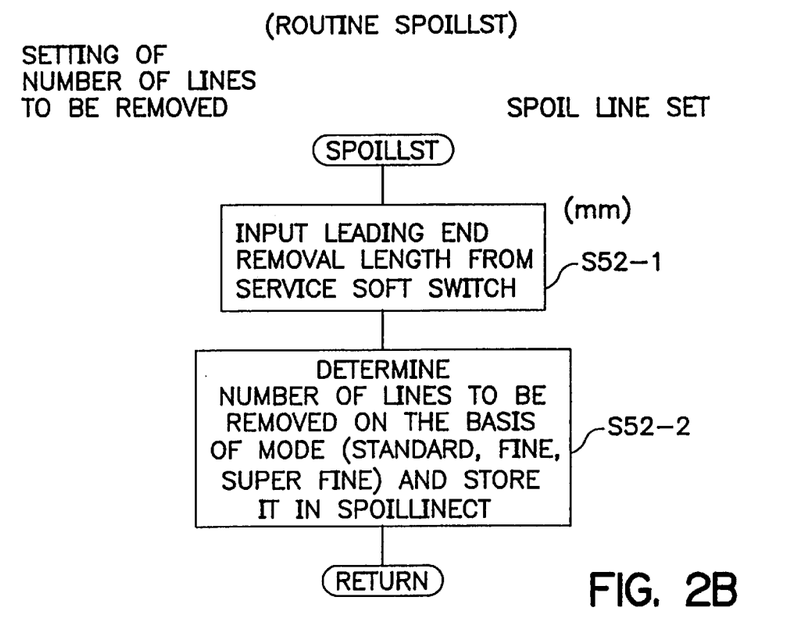

In Step S52, the spot line set routine (routine for setting the number of leading end lines to be removed) is called so that the number of lines to be removed in a recording mode (the mode of record line density) is determined from the leading end removal length CUT LENPRE (mm) selected by the service soft switch and stored in the counter SPOILLINECT (refer to FIG. 2(B)).

In Step S54, the print line set routine (the routine for setting a margin line number) is called so that the line number in the present recording mode is determined from the length obtained by adding the trailing end margin to the leading end margin. This number is then stored in the counter PRINTLINECT (refer to FIG. 2(D)).

Figure 2C:
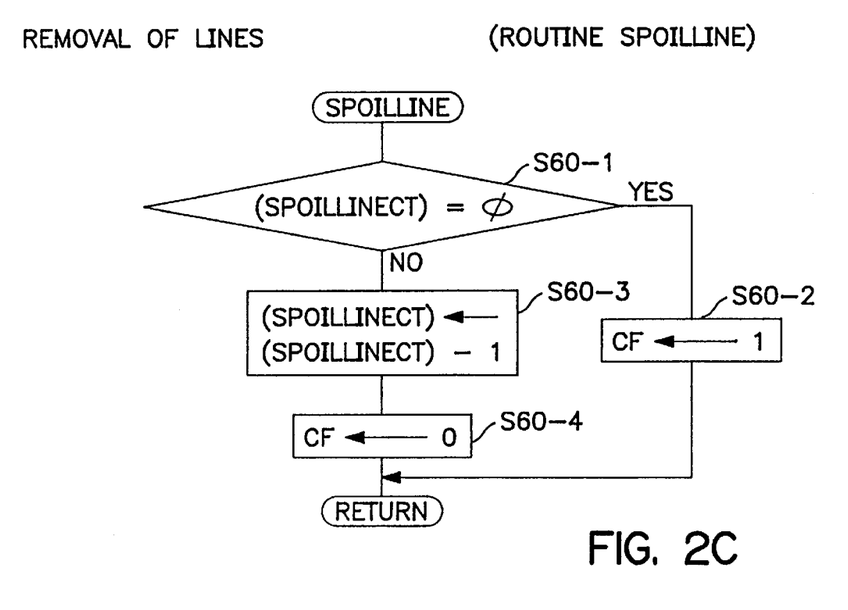
Figure 2D:
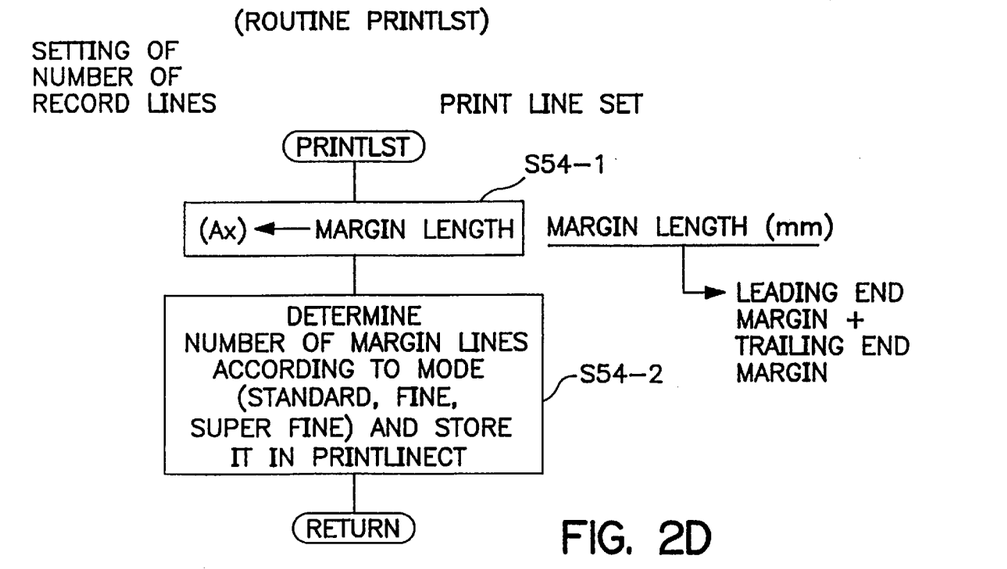
Figure 2E:
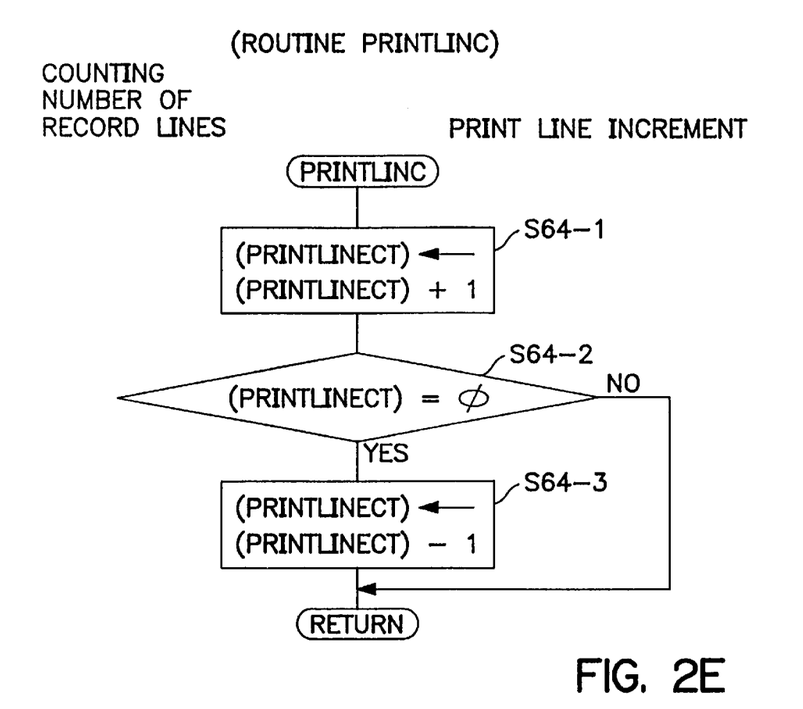
Figure 2F:
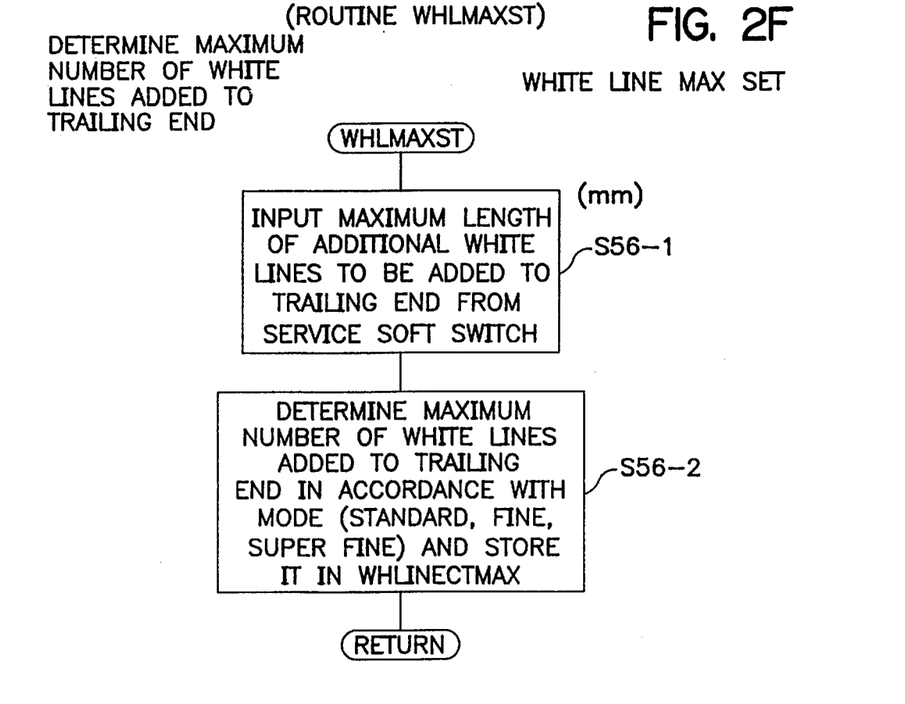
Figure 2G:
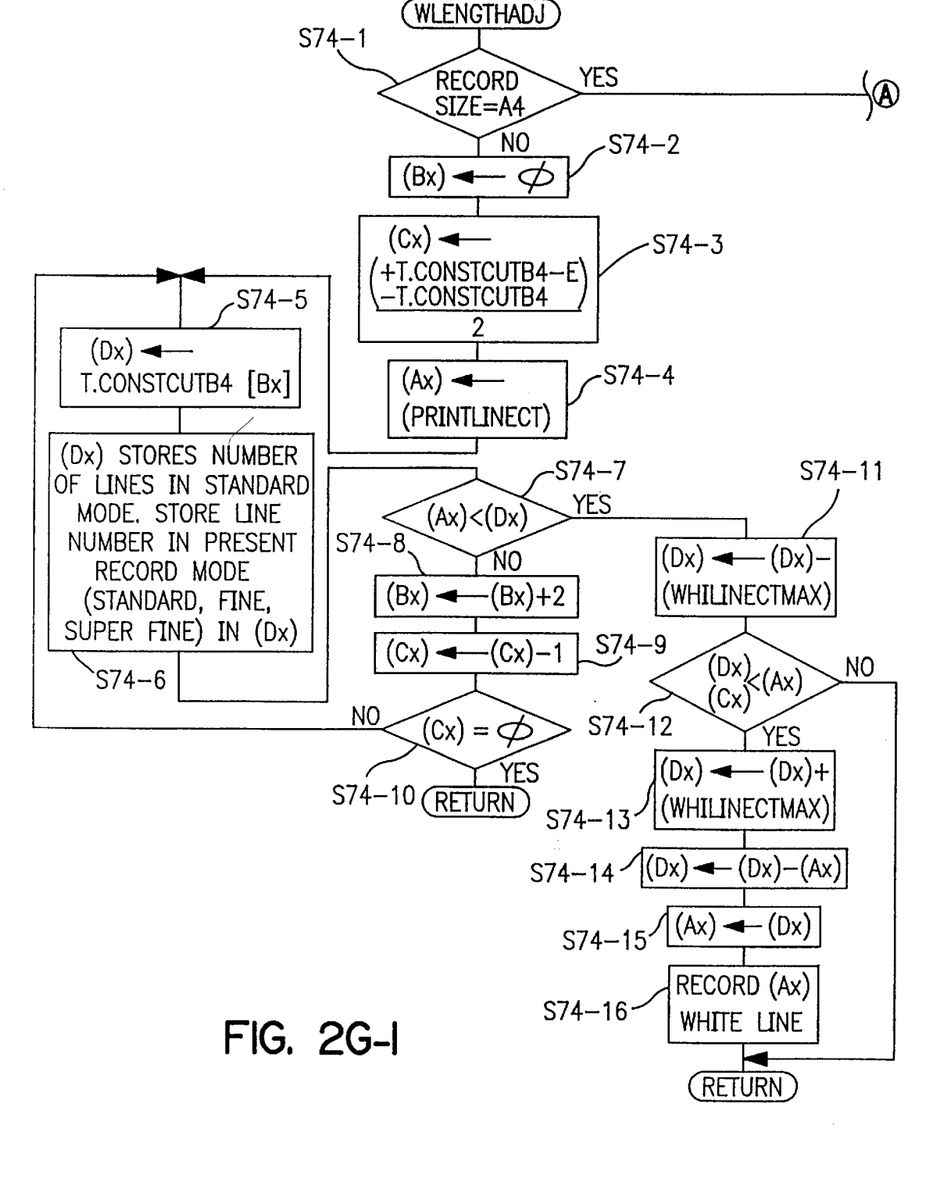
FIG. 2(H) to 2(I) are reference tables showing line numbers for cutting standard size paper.
Figure 2G:
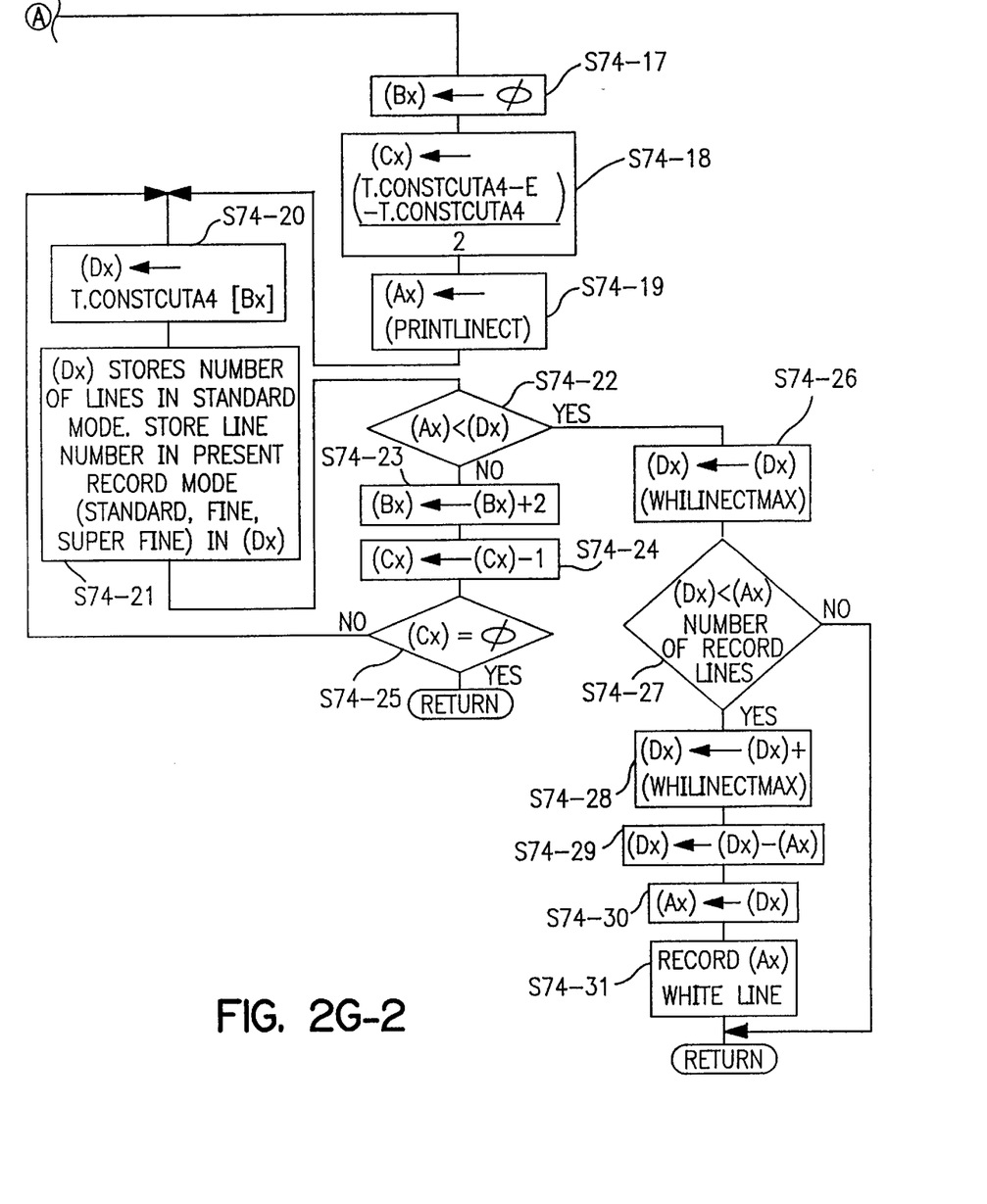

In Step S56, the blank line max set routine (the routine for setting the line number of the maximum length of trailing end additional blank lines) is called so that the line number in the recording mode is determined from the maximum length CUTLEN ADJ (mm) of trailing end additional blank space selected by the service soft switch and stored in the counter WHLINECTMAX (refer to FIG. 2(F)).

In Step S58, a decision is made based on the user soft switch as to whether or not the standard paper size cut mode is selected. When it is decided in Step S58 that the standard paper size cut mode is selected, the flow moves to Step S60. When the standard size paper cut mode is not selected, the flow moves to Step S66 for normal receiving and recording (the receive image data is decoded and recorded by one line).

In the standard size paper cut mode, when the flow moves from Step S58 to Step S60, the spoil line routine is called so that the number of the leading end lines to be removed is checked. If the number of lines to be removed is greater than zero, the counter SPOILINECT is decremented by one and the flow returns with CF=φ, while if no lines need to be removed, the flow returns with CF=1 (refer to FIG. 2(C)).

If CF=0 in Step S62, i.e., the leading end information needs to be removed, the flow moves to Step S68 in which the received image data for one line is removed and not recorded. If CF=1, i.e., the leading end blank spaces are already added, the flow moves to Step S64 in which the print line increment routine is called so that the counter PRINTLINECT obtained by adding the record line number to the additional line number, is increased by one (refer to FIG. 2(E)).

In Step S66, the received image data for one line is recorded.

In Step S68, a decision is made as to whether or not the recording of one page is completed. If one-page recording is completed, the flow moves to Step S70, while if one-page recording is not completed, the flow returns to Step S58 for recording the next line. The one-page recording end in Step S68 represents the end of recording of the received image on one page.

In Step S70, a decision is made as to whether or not the one-communication cut mode is selected. If the one-communication cut mode is selected, standard size paper cutting is not executed, and the flow moves to Step S78 in which a decision is made as to whether or not the receive record of the next page is present. When the one-communication cut mode is not selected, the flow moves to Step S72 in which a decision is made based on the user soft switch whether or not the standard size paper cut mode is selected. When the standard size paper cut mode is selected, the flow moves to Step S74, while when the standard size paper cut mode is not selected, the flow moves to Step S76. When the flow moves from Step S72 to Step S74 by the selection of the standard size paper cut mode, the white length adjust routine is called so that when the total length of the recorded information plus the margins (particularly, the trailing end margin length is added to the leading end margin length) is between the standard size paper length, n, minus the maximum length of trailing end additional blank space and the standard size length n, white lines are added to produce the standard size length n. In the case of A4-width recording, the A5, letter, A4 or legal size paper length is considered as the standard size paper length n. In the case of B4-width recording, the B5 or B4 size length is considered as the standard size paper length n (refer to FIG. 2(G)).

In Step S76, the cutting operation is performed.

In Step S78, a decision is made as to whether or not the next page to be recorded is present. When the next page is present, the flow moves to Step S52 for recording the next page, while when all pages are completely received and recorded, the flow moves to Step S80 for ending the control of recording.

Figure 3:
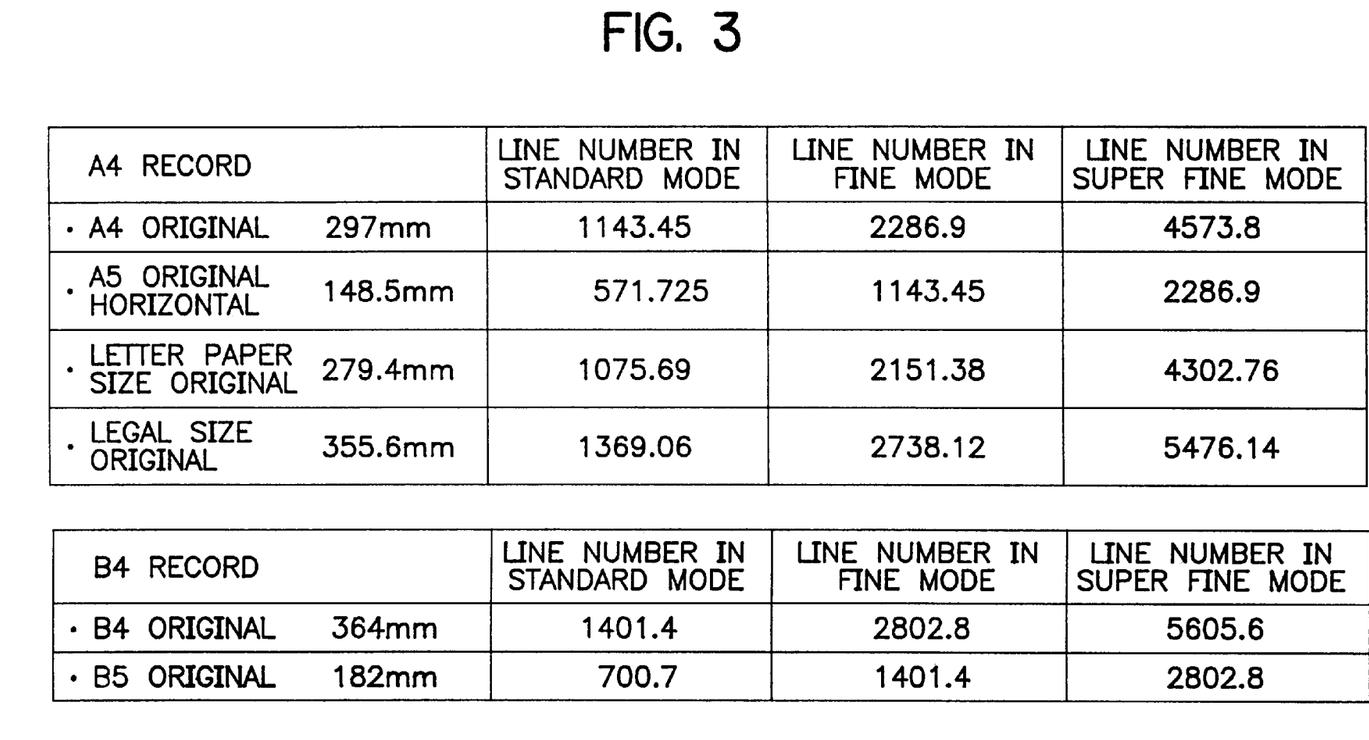
FIG. 3 is a table showing standard paper sizes and the line number in a vertical scanning length corresponding to each of three modes.

FIG. 3 shows the relation between the standard paper sizes and the number of lines in the vertical scanning length used for decision in each of modes.

FIG. 2(B) shows the routine for setting the number of lines to be removed in Step S52 shown in FIG. 2(A).

In Step S52-1, the data about the leading end removal length (mm) is read from the previously set service soft switch. In Step S52-2, the data about the removal line number corresponding to the resolution of an image (3.85 pel standard, 7.7 pel fine, 15.4 pel superfine) is determined and stored in the counter SPOILLINECT provided in the RAM.

FIG. 2(C) shows the routine (SPOILLINE routine) for removing lines in Step S60 shown in FIG. 2(A).

In Step S60-1, a decision is made as to whether or not the value (line number) of the counter SPOILLINECT provided in the RAM is zero. If the value of the counter SPOILLINECT is zero, it indicates that the removal of the leading lines is completed, and the flag CF is set to "1" in Step S60-2. If the value of the counter SPOILLINECT is not zero, the value of the counter SPOILLINECT is decremented (subtract 1) in Step S60-3, and the flag CF is set to "0" in Step S60-4.

FIG. 2(D) shows the routine (PRINTLST routine) for setting the record line number in Step S54 shown in FIG. 2(A).

In Step S54-1, the margin length in mm which is obtained by adding the leading end margin length, to the trailing end margin length is read. In Step S54-2, the line number corresponding to the recording resolution of an image with the margin length is determined and stored in the counter PRINTLINECT provided in the RAM. The line number of the margin length is the default value of the record line number.

FIG. 2(E) shows the routine (PRINTLINC routine) for counting the record line number in Step S64 shown in FIG. 2(A).

In Step S64-1, the value of the counter PRINTLINECT for the record line number is increased. The processing in Steps S64-2 and S64-3 is provided for preventing the overflow of the counter (preventing the value of the 8-bit counter from being increased from hexadecimal "FF" to zero) and setting the count value to hexadecimal "FF" when the counter value is zero as a result of incrementing the counter PRINTLINECT.

FIG. 2(F) shows the routine (WHLMAXST routine) for setting the maximum value of the trailing end additional white line number in Step S56 shown in FIG. 2(A).

In Step S56-1, the data on the maximum length of the trailing end additional white lines is read from the service soft switch information. In Step S56-2, the line number corresponding to the resolution of an image with white lines having the maximum length is determined and stored in the counter WHLINECTMAX.

FIG. 2(G) shows the routine (WHENGTHADJ routine) for adjusting the margin length in Step S74 shown in FIG. 2(A).

In Step S74-1, a decision is made as to whether or not the record size is A4. If the record size is A4, the flow moves to Step S74-17, while if the record size is not A4, the flow moves to Step S74-2. Steps S74-2 to S74-16 are provided for adjusting the margin length in the B4 size.

Figure 2H:
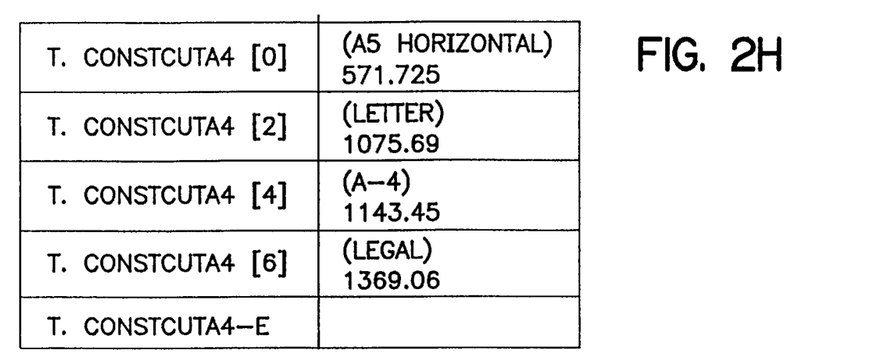
Figure 2I:
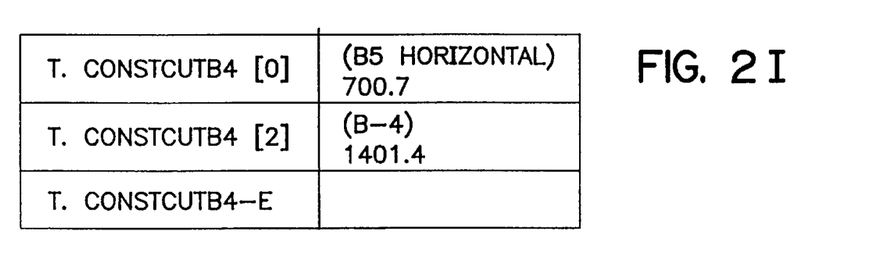

In Step S74-2, zero is stored (clear) in the register BX for referring to the table shown in FIG. 2(I) (T.CONSTCUTB4) in which the line number data of the standard cut sizes is stored. In Step S74-3, the maximum value (the value obtained by subtracting the table value of the number lines in the B5 horizontal length in the standard mode from the table value of the B4 end and dividing the result by 2) of the reference numbers in the table of the line number data for the standard cut sizes is set in a register CX for detecting the end of reference to the table. In Step S74-4, the value of the record line number stored in the counter PRINTLINECT is stored in the register AX. In Step S74-5, the value obtained by referring to the standard cut size table T.CONSTCUTB4 shown by the register BX is stored in the register DX. Since the recording density is shown by the line number in the standard mode in the table T.CONSTCUTB4, the line number is changed to a number according to the present recording mode (standard mode, fine mode, superfine mode) and again stored in the register DX, and the flow then moves to Step S74-7.

In Step S74-7, comparison between the register AX and the register DX, both of which store the recording line number, is made. When the value of the register AX is smaller than that of the register DX, the flow moves to Step S74-11, while when the value of the register AX is greater than that of the register DX, 2 is added to the value of the register BX in Step S74-8, and the value of the register CX is decreased in Step S74-9. In Step S74-10, a decision is made as to whether or not the value of the register CX is zero, indicating that reference to the table is completed. If the value is not zero, the flow returns to Step S74-5 for additional reference to the table. When it is decided in Step S74-10 that reference to the table is completed, the flow moves to Step S76. On the other hand, if it is decided in Step S74-7 that the value of the register AX is smaller than that of the register DX, the maximum number of white lines added to the trailing end (value of the counter WHLINECTMAX) is subtracted from the line number of the register DX in Step S74-11, and a decision is made in Step S74-12 as to whether or not the decreased line number of the register DX is smaller than that of the register AX. When the line number of the register DX is smaller than that of the register AX, the value of the counter WHLINECTMAX is added to the register DX in Step S74-13, the value of the register AX is subtracted from the value of the register DX in Step S74--14, and the value of the register DX is stored in the register AX in Step S74-15. White lines corresponding to the line number of the register AX are recorded in Step S74-16, and the flow moves to Step S76 shown in FIG. 2(A). It is decided in Step S74-12 that the value of the register DX is greater than that of the register AX, the flow moves to Step S76.

On the other hand, if is decided in Step S74-1 that the recording size is A4, the margin length in the A4 size is adjusted. However, the processing is the same as that in the case of the B4 size, with the exception that the reference table is different.

FIGS. 2(H) and 2(I) respectively show the reference table T.CONSTCUTB4 in the case of B4 size, and reference table of T.CONSTCUTTTA4 in the case of the A4 size.

In the above embodiment, the blank lines which are added to obtain the standard size paper length may be generated by performing successive line feed operations of the recording paper, without the performance of any actual printing operation required.

In addition, although the recording length in the vertical scanning direction is changed according to the record size (not paper size, but the actual record size), the recording length may be changed according to the recording paper size.

Further, even in the one-communication cut mode, when only one sheet is received, the standard size paper cutting mode is effective.

As described above, the embodiment enables the realization of standard size paper cutting without the need for a large capacity memory. In addition, since standard size paper cutting is performed in consideration of a margin or the like, appropriate standard size paper can be obtained. Further, since the embodiment enables the operator to manually select the standard size paper cut mode, the leading end removal length of an image, and the maximum length of the trailing end additional blank space, an image on standard paper which suits the personal needs of the operator can be obtained.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An image recording apparatus for recording an image on a rolled paper, and for cutting the rolled paper on which the image has been recorded to a standard size, said image recording apparatus comprising:

detection means for detecting a record size of an image recorded on the rolled paper;

storage means for storing a plurality of data values respectively representing a plurality of predetermined lengths corresponding to a plurality of standard sizes;

selection means for selecting a selected length from the plurality of predetermined lengths, the selected length (i) being longer than a length corresponding to the detected image record size, and (ii) being nearest to a length corresponding to the detected image record size from among the plurality of predetermined lengths; and cutting means for cutting the rolled paper, on which the image has been recorded, to the length selected by said selection means.

2. An image recording apparatus according to claim 1, further comprising:

setting means for setting a length of a top end portion of an image; and control means for inhibiting printing at the top end portion set by said setting means.

3. An image recording apparatus according to claim 1, wherein said cutting means comprises a cut mode for cutting the rolled paper in accordance with the recorded image length.

4. An image recording apparatus according to claim 1, further comprising means for selecting a standard size cut mode.

5. An image recording apparatus according to claim 1, wherein the detected image length includes an added predetermined length, the predetermined length corresponding to a portion in which recording cannot be performed due to characteristics of said image recording apparatus.

6. An image recording apparatus according to claim 1, wherein said detection means detects the image length by counting a number of lines in the image.

7. An image communication apparatus for recording an image received through a circuit on a rolled paper, and for cutting the rolled paper on which the received image has been recorded to a standard size, said image communication apparatus comprising:

detection means for detecting a record size of a received image recorded on the rolled paper;

storage means for storing a plurality of data values respectively representing a plurality of predetermined lengths corresponding to a plurality of standard sizes;

selection means for selecting a selected length from the plurality of predetermined lengths, the selected length (i) being longer than a length corresponding to the detected received image record size, and (ii) being nearest to a length corresponding to the detected received image record size from among the plurality of the predetermined lengths; and cutting means for cutting the rolled paper, on which the received image has been recorded, to the length selected by said selection means.

8. An image communication apparatus according to claim 7, further comprising:

setting means for setting a length of a top end portion of a received image; and control means for inhibiting printing at the top end portion set by said setting means.

9. An image communication apparatus according to claim 7, wherein said cutting means operates in at least one cut mode for cutting a rolled paper in accordance with the recorded received image length.

10. An image communication apparatus according to claim 7, further comprising means for selecting a standard size cut mode.

11. An image communication apparatus according to claim 7, further comprising means for selecting a one-communication cut mode so that standard size cutting is not performed when the one-communication cut mode is selected.

12. An image communication apparatus according to claim 7, wherein said detection means detects the received image length by counting a number of lines in the received image.

13. An image recording method for recording an image on a rolled paper, and for cutting the rolled paper on which the image has been recorded to a standard size, said method comprising the steps of:

detecting a record size of an image recorded on the rolled paper;

selecting a selected length from a predetermined plurality of lengths, corresponding to a plurality of standard sizes, such that the selected length is (i) longer than a length corresponding to the detected record size of the image, and (ii) nearest to a length corresponding to the detected record size of the image from among the predetermined plurality of lengths; and cutting the rolled paper, on which the image has been recorded, to the selected length.

14. An image recording method according to claim 13, further comprising the steps of:

setting a length of a top end portion of an image; and inhibiting printing at the top end portion set in said setting step.

15. An image recording method according to claim 13, wherein said cutting step comprises the step of entering a cut mode for cutting the rolled paper in accordance with the detected image length.

16. An image recording method according to claim 13, further comprising the step of selecting a standard size cut mode.

17. An image recording method according to claim 13, wherein the detected image length includes an added predetermined length, the predetermined length corresponding to a portion in which recording cannot be performed due to apparatus characteristics.

18. An image recording method according to claim 13, wherein said detecting step comprises the step of counting a number of lines in the image.

19. An image recording method for recording an image received through a circuit on a rolled paper, and for cutting the rolled paper on which the received image has been recorded to a standard size, said method comprising the steps of:

detecting a record size of a received image recorded on the rolled paper;

selecting a selected length from a predetermined plurality of lengths, corresponding to a plurality of standard sizes, such that the selected length is (i) longer than a length corresponding to the detected record size of the received image, and (ii) nearest to a length corresponding to the detected record size of the received image from among the predetermined plurality of lengths; and cutting the rolled paper, on which the received image has been recorded, to the selected length.

20. An image recording method according to claim 19, further comprising the steps of:

setting a length of a top end portion of a received image; and inhibiting printing at the top end portion set in said setting step.

21. An image recording method according to claim 19, wherein said cutting step comprises the step of entering a cut mode for cutting the rolled paper in accordance with the detected image length.

22. An image recording method according to claim 19, further comprising the step of selecting a standard size cut mode.

23. An image recording method according to claim 19, further comprising the step of selecting a one-communication cut mode so that standard size cutting is not performed when the one-communication cut mode is selected.

24. An image recording method according to claim 19, wherein said detecting step comprises the step of counting a number of lines in the received image.

25. An image recording apparatus for recording an image on a rolled paper, and for cutting the rolled paper on which the image has been recorded to a standard size, said image recording apparatus comprising:

detection means for detecting a record size of an image recorded on the rolled paper;

storage means for storing a plurality of data values respectively representing a plurality of predetermined lengths corresponding to a plurality of standard sizes;

selection means for selecting a selected length from the plurality of predetermined lengths, the selected length being longer than a length corresponding to the detected image record size which is different from the plurality of predetermined lengths; and cutting means for cutting the rolled paper, on which the image has been recorded, to the length selected by said selection means.

26. An image recording apparatus according to claim 25, further comprising:

setting means for setting a length of a top end portion of an image; and control means for inhibiting printing at the top end portion set by said setting means.

27. An image recording apparatus according to claim 25, wherein said cutting means comprises a cut mode for cutting the rolled paper in accordance with the recorded image length.

28. An image recording apparatus according to claim 25, further comprising means for selecting a standard size cut mode.

29. An image recording apparatus according to claim 25, wherein the detected image length includes an added predetermined length, the predetermined length corresponding to a portion in which recording cannot be performed due to characteristics of said image recording apparatus.

30. An image recording apparatus according to claim 25, wherein said detection means detects the image length by counting a number of lines in the image.

31. An image communication apparatus for recording an image received through a circuit on a rolled paper, and for cutting the rolled paper on which the received image has been recorded to a standard size, said image communication apparatus comprising:

detection means for detecting a record size of a received image recorded on the rolled paper;

storage means for storing a plurality of data values respectively representing a plurality of predetermined lengths corresponding to a plurality of standard sizes;

selection means for selecting a selected length from the plurality of predetermined lengths, the selected length being longer than a length corresponding to the detected received image record size which is different from the plurality of predetermined lengths; and cutting means for cutting the rolled paper, on which the image has been recorded, to the length selected by said selection means.

32. An image communication apparatus according to claim 31, further comprising:

setting means for setting a length of a top end portion of a received image; and control means for inhibiting printing at the top end portion set by said setting means.

33. An image communication apparatus according to claim 31, wherein said cutting means operates in at least one cut mode for cutting a rolled paper in accordance with the recorded received image length.

34. An image communication apparatus according to claim 31, further comprising means for selecting a standard size cut mode.

35. An image communication apparatus according to claim 31, further comprising means for selecting a one-communication mode so that standard size cutting is not performed when the one-communication mode is selected.

36. An image communication apparatus according to claim 31, wherein said detection means detects the received image length by counting a number of lines in the received image.

37. A method of recording an image on a rolled paper, and for cutting the rolled paper on which the image has been recorded to a standard size, said image recording method comprising the steps of:

detecting a record size of an image recorded on the rolled paper;

storing a plurality of data values respectively representing a plurality of predetermined lengths corresponding to a plurality of standard sizes;

selecting a selected length from the plurality of predetermined lengths, the selected length being longer than a length corresponding to the detected image record size which is different from the plurality of predetermined lengths; and cutting the rolled paper, on which the image has been recorded, to the length selected by said selection means.

38. A method according to claim 37, further comprising the steps of:

setting a length of a top end portion of an image; and inhibiting printing at the top end portion set by said setting means.

39. A method according to claim 37, wherein said cutting is done in a cut mode for cutting the rolled paper in accordance with the recorded image length.

40. A method according to claim 37, further comprising the step of selecting a standard size cut mode.

41. A method according to claim 37, wherein the detected image length includes an added predetermined length, the predetermined length corresponding to a portion in which recording cannot be performed.

42. A method according to claim 37, wherein said detection of the image length is by counting a number of lines in the image.

43. A method for recording an image received through a circuit on a rolled paper, and for cutting the rolled paper on which the received image has been recorded to a standard size, said method comprising the steps of:

detecting a record size of a received image recorded on the rolled paper;

storing a plurality of data values respectively representing a plurality of predetermined lengths corresponding to a plurality of standard sizes;

selecting a selected length from the plurality of predetermined lengths, the selected length being longer than a length corresponding to the detected received image record size which is different from the plurality of predetermined lengths; and cutting means for cutting the rolled paper, on which the image has been recorded, to the length selected by said selection means.

44. A method according to claim 43, further comprising the steps of:

setting a length of a top end portion of a received image; and inhibiting printing at the top end portion set by said setting means.

45. A method according to claim 43, wherein said cutting means operates in at least one cut mode for cutting a rolled paper in accordance with the recorded received image length.

46. A method according to claim 43, further comprising means for selecting a standard size cut mode.

47. A method according to claim 43, further comprising the step of selecting a one-communication mode so that standard size cutting is not performed when the one-communication mode is selected.

48. A method according to claim 43, wherein said detecting of the received image length is by counting a number of lines in the received image.

\* \* \* \* \*